Patented Dec. 22, 1931

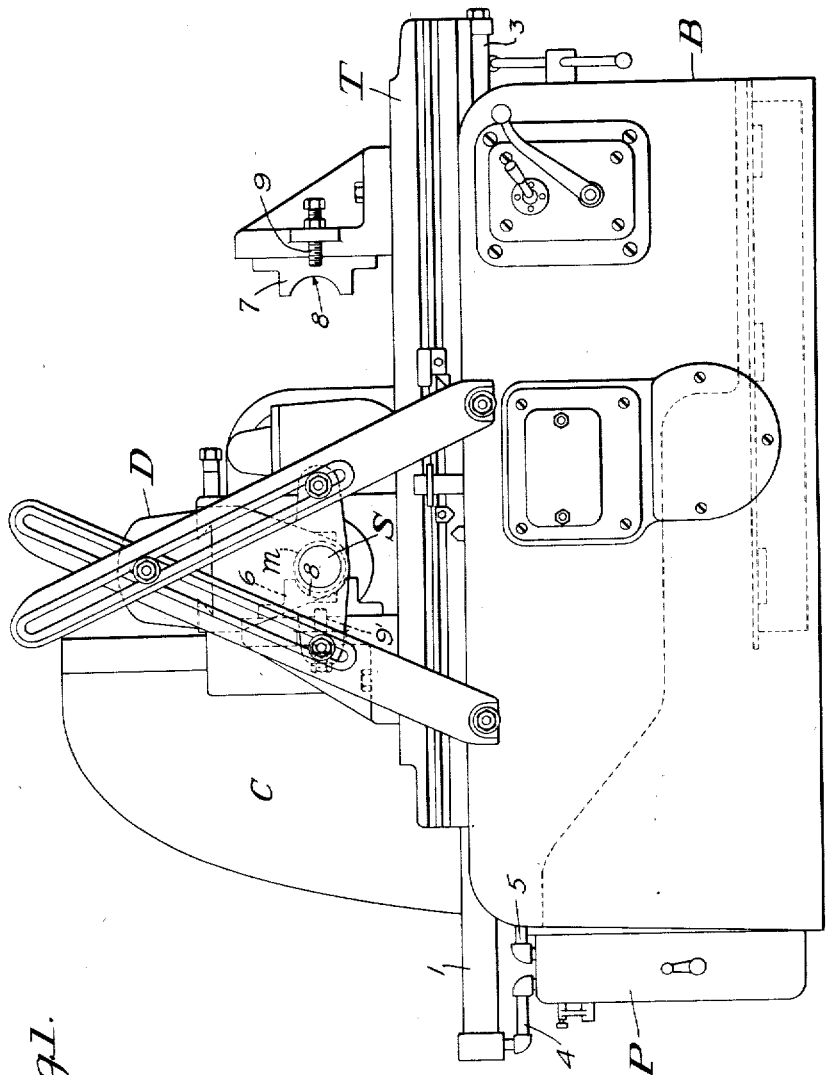

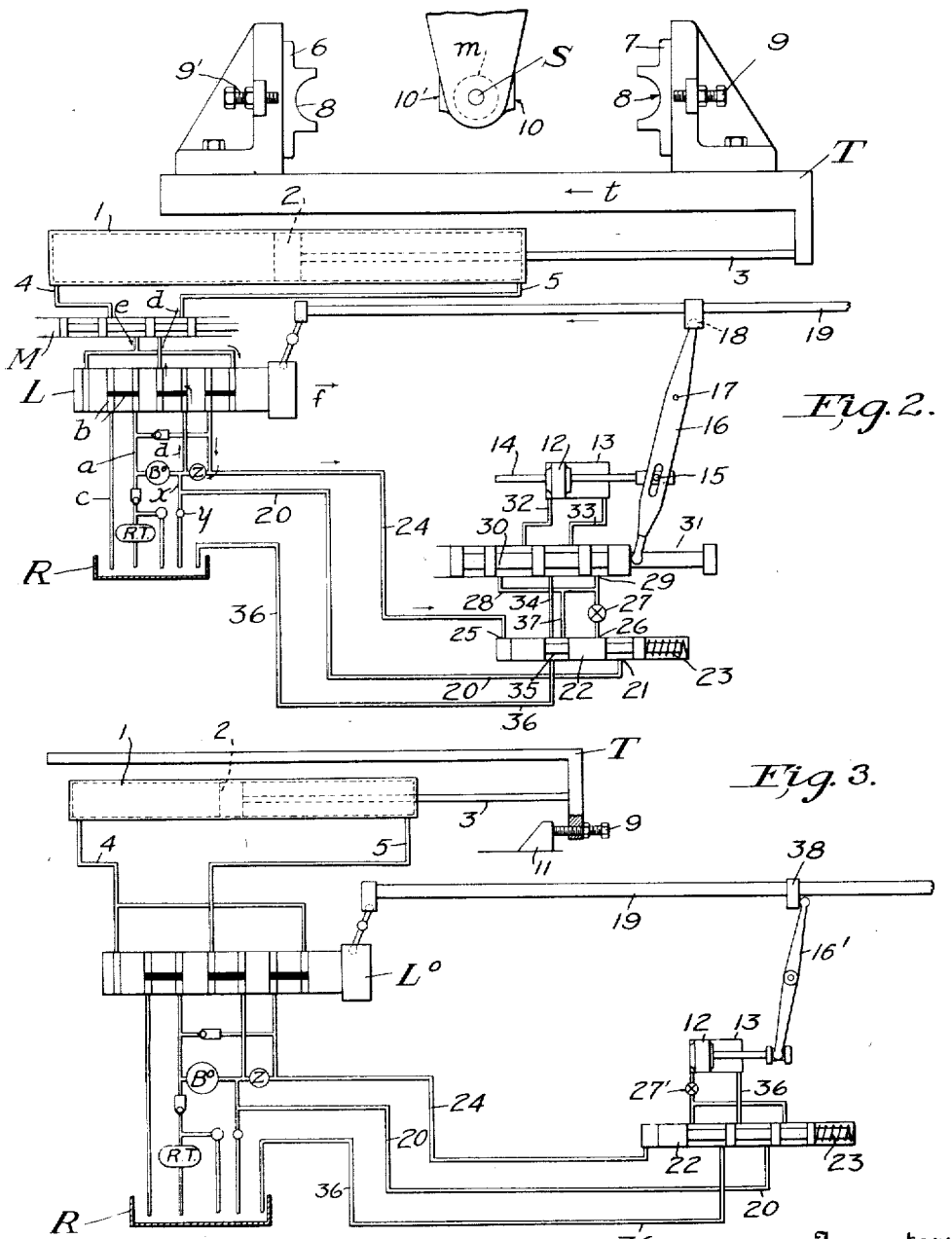

1,838,028

UNITED STATES PATENT OFFICE

HANS ERNST AND LESTER F. NENNINGER, OF CINCINNATI, OHIO, ASSIGNORS TO THE CINCINNATI MILLING MACHINE COMPANY, OF CINCINNATI, OHIO, A CORPORATION OF OHIO

DEFERRED ACTION REVERSING MECHANISM

Original application filed September 15, 1927, Serial No. 220,721. Divided and this application filed December 18, 1928. Serial No. 326,842.

This invention deals with hydraulically actuated machine tools and it relates more particularly to automatically controlled means for producing a pause in the action of the hydraulic system when conditions in the system are reversed.

Hydraulic systems, as commonly constructed, include a fluid delivery means, a hydraulic motor receiving fluid under pressure from said delivery means and a valve mechanism for controlling the flow of fluid from the delivery means to the hydraulic motor, whereby the motor may be caused to operate in either forward or reverse directions. The motor frequently consists of a cylinder and a piston slidably fitted therein and fluid under pressure, admitted alternately into opposite ends of the cylinder, effects reciprocatory movements between the cylinder and the piston. The cylinder is usually (but not always) a fixed member and the piston receives the reciprocatory motions. To enable the motor to perform work the piston is usually connected to some movable element by means of a suitable piston rod.

Hydraulic systems of this nature are frequently employed to actuate machine tools, the piston being connected to a translatable element of the machine and the reciprocatory movements of the piston being utilized to effect feed or traverse movements of the translatable element. A milling machine is a good example of a machine tool in which such a system has been embodied to advantage, the reciprocable work-table being the member connected with the piston to receive bodily movements therefrom.

These systems heretofore have been provided with automatically actuated valve mechanisms adapted, at a predetermined point in the translation of the movable element, to reverse the action throughout the system thereby to effect a reversal in the direction of translation of said element. These valve mechanisms have been actuated by various mechanical devices which, at a predetermined time, act instantaneously to effect reversal. Many of the valves have been actuated by so-called "load-and-fire" devices i. e. devices adapted to be put under spring tension and then released instantaneously at a predetermined time.

There are certain conditions in the operation of machine tools which make it highly desirable that a pause be produced between the movement of the translated element in one direction and its movement in the reverse direction.

The primary object of this invention is to render available an automatically actuated control means for hydraulic systems whereby a substantial pause may be produced between the end of movement of an element in one direction and the beginning of its movement in a reverse direction.

The utility of a device of this nature can best be perceived and appreciated by considering it in connection with a typical problem in machining operations. For example, suppose it is desired to mill out so-called "half-bearings;" the work is set up on the translatable table of a milling machine and fed to the tool. As each tooth of the rotating milling cutter engages the work-piece it removes a portion of the metal therefrom and the action of the tooth leaves a more or less roughened surface thereon. When the tool has entered the work to the desired depth, if the feed is reversed instantaneously, the work will be withdrawn from the milling cutter with a substantially roughened surface due to the action of the teeth of the cutter.

To overcome this undesirable condition and thereby to produce smoother work, this invention proposes a delayed action reversing mechanism which will act at a predetermined point, as may be determined by a fixed stop, to arrest the forward movement of the work but to maintain the work piece in contact with the rotating cutter whereby the cutter will, through its continued action, remove all tooth marks on the work and produce thereon a highly finished surface analogous to a reamed surface. After a predetermined pause, sufficient to produce the required finish on the work-piece, the automatic control device proposed by this invention, acts to reverse the action of the hydraulic feed thereby to retract the table and remove the work-piece from the cutter.

This application is a division of our application, Serial No. 220,721, filed September 15, 1927.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which :—

Figure 1 is a side elevation of a milling machine embodying the present invention.

Fig. 2 is a diagrammatic representation of a hydraulic system embodying the improved deferred action reversing mechanism in which it is adapted to produce a pause at each end of the stroke in a reciprocating cycle. Fig. 3 is a similar representation for producing at one end of the stroke in a one-way cycle.

Referring more specifically to the drawings the invention is shown as embodied in a milling machine comprising a base B, a work-table translatably mounted thereon, a column C arising from the base, a carriage D adjustably supported on the column and a tool spindle S rotatably journaled in the carriage and carrying the milling cutter $m$. Conventional means, (not shown) is provided for continuously rotating the spindle.

Reciprocatory motions are given to the work-table by means of a hydraulic motor comprising a cylinder 1 fixed to the base B and a piston 2 slidingly fitted within said cylinder and connected with the table by a piston rod 3.

A hydraulic system comprising a reservoir R, a rapid traverse pump RT, a booster pump $B^0$, a variable delivery pump Z and suitable conduits, all of which are described in detail, in the parent application above referred to, serve to effect the necessary flow of fluid to produce rapid and slow translation of the work-table in both forward and reverse directions. The pumps RT, $B^0$ and Z are preferably embodied in a pump unit P.

A main control valve L, adapted to receive both rotary and axial movements, serves so to connect the pumps with the pipes 4 and 5 connected with opposite ends of the cylinder that the table is given the required rate and direction of movement. A stop valve M intermediate the main valve L and the hydraulic motor may be actuated to isolate the motor from the pressure system and to trap the actuating fluid in the opposite ends of the cylinder 1, thereby to lock the table in any desired position.

Inasmuch as the construction of the valves L and M and the means for effecting variations in the rate of movement of the table form no part of this invention detailed illustration and description thereof is deemed unnecessary. Suffice it to say that the rapid movement of the table is effected by fluid passed by the pump RT; and that the slow feed of the table is produced by fluid transmitted by the pump Z into the cylinder 1, in combination with fluid passed by the booster pump $B^0$, the principal office of which is to maintain a high pressure in the system and secondarily to replenish the system with fluid to compensate for leakage losses. A suitable relief line $x$, controlled by a relief valve $y$ serves to return to the reservoir excess fluid passed by the booster pump and the fluid passed by the variable pump when the piston 2 is positively held against movement. The rate at which the table is moved, under the influence of the pumps Z and $B^0$, during its feeding stroke, is determined by the rate at which fluid is permitted to escape from the exhaust end of the cylinder 1. This is preferably effected by connecting the intake of the variable delivery pump with the exhaust end of the cylinder whereby the variable pump acts as a metering escapement device for the exhaust fluid.

As illustrated in Fig. 2, the system is set to effect slow feeding movements of the table T to the left, as indicated by the arrow $t$. In this setting of the valve L the continuously running rapid traverse pump draws fluid (preferably oil) from the reservoir, exhausts it through conduit $a$, passages $b$ in the main valve and back through return conduit $c$ to the reservoir. Thus the rapid traverse pump is ineffective insofar as movement of the table is concerned. The exhaust port of the variable delivery pump is connected with the right end of the cylinder through the passages indicated by the arrows $d$. The booster pump continuously draws oil from the exhaust line of the rapid traverse pump and injects it into the exhaust line of the variable pump to maintain the system filled and to elevate the pressure therein. As indicated by the arrows $e$ the intake side of the variable delivery pump is connected with left end of the hydraulic cylinder 1 and serves to permit fluid to be expelled therefrom at a volumetrically uniform rate.

As hereinbefore stated the rate and direction of translation of the work-table may be changed by rotating and translating the main control valve L. From the position shown in Fig. 2, an axial movement of the valve L, in the direction indicated by the arrow $f$, will cause the table to be moved in a direction opposite to that indicated by the arrow $t$.

The objects of this invention are attained by the construction and arrangement illustrated in Fig. 2 which serves to shift the main valve L longitudinally to effect reversal of the table and to produce an appreciable pause between the time the table is brought to a full stop and the initiating of the reverse movement. The object of having a pause is to enable a cutter to run in contact with the work during a non-feeding interval so that it may impart a finer finish to the work than results when it is feeding. For instance, as shown in Fig. 2, when forming half bearings 6 and 7 mounted on appropriate brackets bolted to the respective ends of the table T, the cutter will first feed into the castings to shape the semi-circular seats 8. After the required depth of the cut has been attained, it is desired that the translation of the table should be entirely discontinued while the cutter is still in engagement with the work and that the cutter should continue to run without any feeding for an appreciable interval when in this position so as to eliminate all feed marks and produce the highly finished surface analogous to a reamed surface. The translation of the table is arrested positively by the abutment of an adjustable stop 9 either against a corresponding lug 10 carried by the support for the spindle, or by a lug 11 affixed to the bed of the machine as indicated by Fig. 3. When this contact is established it is manifest the hydraulic effort will be unable further to advance the table and this insures that the table should stop at a very exact point and will remain in that stopped position until the main valve is reversed.

The shifting of the main valve is accomplished hydraulically in this instance by means of an auxiliary hydraulic motor comprising a piston 12 and an auxiliary cylinder 13 within which the piston is slidingly fitted. The piston rod 14 has a pin-and-slot connection 15 with a lever 16 adapted to swing about a fixed pivot 17. The upper end of this lever has a ball and socket connection 18 with a shift rod 19 which controls the position of the main control valve L, previously described. Things are so arranged that the piston 12 will not swing the lever 16 until at the end of a predetermined interval after the table has ceased to advance. This is done hydraulically; taking advantage of the fact that the pressure between the metering escapement pump and the advancing side of the main piston 2 which moves the table will drop to a low pressure. It will be remembered that during the feeding stroke a high constant pressure is maintained in one end of the cylinder 1 and this pushes the piston 2 to the other end of the cylinder and forthwith raises and maintains the pressure to a high magnitude; the advance of the piston 2 being permitted only by the volumetrically constant release of oil from the end of the cylinder then connected with the metering escapement pump. But if the piston be restrained from advancing by the mechanical stops mentioned, then it will cease to exercise pressure against the oil ahead of it and since the metering pump is constantly operating, the pressure will forthwith drop to a low point. This diminution in pressure is utilized to switch oil into the cylinder 13 behind the piston 12 and cause the latter to move the lever 16 in the following manner.

A conduit 20 leads from a high constant pressure side of the main hydraulic system to the port 21 in the casing of a spring valve 22. This valve is normally shifted against the opposition of a spring 23 by virtue of the then existing high pressure in a conduit 24 deriving its fluid from between the metering displacement pump and the end of the cylinder then in communication with it; this conduit leading to an always open port 25 at one end of the valve 22. This is the condition of the parts during a feeding stroke when the pressure is high in the conduit 24. When that pressure drops due to the mechanical arresting of the table, the spring 23 becomes effective to shift the valve 22 to the left. Thereupon a port 26 is opened and oil is permitted to flow through the throttle valve 27 which is manually adjustable to determine its rate of flow. The slower it flows the longer will be the pause and conversely. After passing the throttle valve the oil goes to the ports 28 and 29 of a reversing valve 30 with which the lower end of the lever 16 has a lost motion connection indicated at 31. When the valve is positioned as shown by Fig. 2 the oil flows through the port 32 and thence into the left hand end of the cylinder 13. This forces the piston 12 to the right and the rod 19 is translated and thereby the main valve L is longitudinally shifted. This consumes an interval of time depending upon the adjustment of the throttle valve 27 and ultimately the main valve L will be moved into its reversing position and the table will then start on its quick traverse return.

In the meantime the lower end of the lever 16 will have taken up its lost motion and will have shifted the valve 30 to the right. This produces no immediate effect but it conditions the valve 30 for admitting oil to the other side of the cylinder 13 when the table has been arrested at the end of its return stroke by means of the fixed stop 9' engaging a lug 10' on the spindle support, i. e. when the cutter is starting to finish the work 6. It should be mentioned that as soon as the main valve "L" has been moved into its reversing position the back pressure in the conduit 24 again rises and again shifts the valve 22 to compress the spring 23 and the parts are in position for performing another pause operation.

The oil escaping from the cylinder 13 either through the conduit 32 or 33, as the case may be, passes through the conduit 34 into the chamber 35 and then through the conduit 36 into the reservoir R. Any excess high pressure oil beyond the throttle valve 27 or leading into the system through the port 26 is permitted to drain through the branch 37, the port of which is open to the chamber 35 when the valve 22 is compressed against its spring but is closed as soon as the spring has become effective to shift the valve to the left.

When there is no necessity for operating the table continually in a reciprocating cycle (fast and then slow to the left, and fast and then slow to the right, and so on) the system shown by Fig. 2 may be simplified into the form shown by Fig. 3 where but one fixed stop is used for arresting the feed of the table only in one direction; the cycle being merely a one-way feed, to wit, quick traverse followed by feed and then a full length reversal at a quick traverse rate. In this case the main valve $L^0$ is of somewhat different form and there is no need for the auxiliary stop valve indicated by M in Fig. 2 nor the direction reversing valve indicated by 30 in Fig. 2. The restoration of the main valve $L^0$ and of the rod 19 are effected manually by the operator for the renewal of each single cycle. In this instance, the same spring valve 22 may be used in conjunction with similar conduits 24, 20 and 36. The lever 16′ in this instance has no extension to a reversing valve and, instead of having a ball and socket connection with the rod 19 it merely bears against a collar 38 to provide lost motion so that after the lever 16′ has moved the rod 19 it may then freely return to its normal position leaving it to the user to restore the rod 19 to its normal position manually. When the adjustable dog 9 contacts with the fixed stop 11, and the pressure consequently drops in the line 24, the high pressure in the line 20 will be transferred from the right side of the piston 12 to its left side (the spring 23 shifting the valve 22) and the high pressure fluid will flow through the adjustable throttle 27′ to shift the piston 12 to the right and move the valve $L^0$ into its quick traverse reversing position. When the piston 12 is moving to the right, the fluid ahead of it will drain to the reservoir through the conduit 36 and when the table has reached the end of its return rapid traverse stroke, the lever 16′, the piston 12 and the valve 22 will be restored to the position shown by Fig. 3.

From the foregoing it will be perceived that this invention provides automatic means for reversing the action of a hydraulic system and for producing a substantial pause between the oppositely directed movements of the member translated thereby.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the general or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:

1. A machine tool combining a rotary cutter; a support therefor; a work support; a hydraulic actuator for effecting relative movement between said supports; a fixed stop adapted to be engaged by a movable one of said supports for arresting said relative movement against the effort of said hydraulic actuator; and means controlled by a resultant pressure variation in said actuator for accomplishing a reversal of said actuator after a predetermined interval of time.

2. A machine tool combining a rotary cutter; a support therefor; a work support; a hydraulic actuator for effecting relative movement between said supports; a main valve; a fixed stop adapted to be engaged by a movable one of said supports for arresting said relative movement against the effort of said hydraulic actuator; and means including a spring-pressed valve, a supplementary piston, and a supplementary reversing valve controlled by a resultant pressure variation in said actuator for accomplishing a reversal of said main valve after a predetermined interval of time.

3. A machine tool combining a hydraulic propeller; a main valve for determining the action of said hydraulic propeller; an auxiliary valve constantly urged in one direction and normally adapted to be hydraulically shifted against said urge; means controlled by said valve for determining the position of said main valve; a conduit communicating with said main valve; and a branch to said auxiliary valve to maintain it under normal pressure and to permit it to be shifted by said urge upon a drop in pressure.

4. A machine tool combining a translatable member; a hydraulic motor operatively connected with said member; a fluid pressure system connected with opposite ends of said motor; a control valve embodied in said system and serving alternately to admit fluid under pressure into opposite ends of said motor to effect oppositely directed reciprocation of said member; a positive stop to limit the extent of translation of said member in a forward direction; and hydraulically actuated means, operatively connected with said fluid pressure system and actuated by variations in pressure therein due to the arrest of said member by said stop, to actuate said valve thereby to reverse the action of the hydraulic motor and the movement of said member.

5. A machine tool combining a translatable member; a hydraulic motor connected with said member; a continuously acting pump adapted to inject fluid into one end of said motor and simultaneously therewith to permit the escape of fluid, at volumetrically uniform rates, from the other end thereof; a main control valve adapted to determine the end of the motor into which fluid shall be injected, a stop adapted to be engaged by said translatable member to arrest the movement of said motor; a by-pass for the fluid then passed by the pump; and means actuated by the reduction in pressure in the exhaust end of the motor, due to the continued escape of fluid therefrom by the continued action of the pump, to actuate said valve to reverse the flow of fluid to and from said motor.

6. A machine tool combining a translatable member; a hydraulic actuator for effecting movement of said member; a fixed stop for arresting the movement of said member against the effort of said hydraulic actuator; a main valve controlling the action of said hydraulic actuator; means including a a spring-pressed valve, a supplementary piston and a supplementary reversing valve controlled by resultant pressure variation in said actuator for accomplishing a reversal of said main valve after a predetermined interval of time; and adjustable means for varying said interval of time.

7. A machine tool combining a translatable member; a hydraulic motor for effecting translation of said member; a conduit system connected with opposite ends of said motor; a pump adapted to force fluid through said conduit system into one end of said motor and simultaneously therewith to serve as an escapement device to regulate volumetrically the rate of exhaust from the other end thereof; a main control valve embodied in said conduit system and adapted to connect the exhaust and intake ports of said pump alternately with opposite ends of said motor; a slide-bar for actuating said valve; an auxiliary hydraulic motor operatively connected with said slide-bar; a conduit system adapted to connect said auxiliary motor with said pump; a spring pressed valve embodied in the last named conduit system and adapted normally to be held against the action of the spring by pressure in one portion of said conduit system to isolate said auxiliary motor from said pump, and to move under the action of the spring when the pressure drops in said portion of the system, thereby to connect the pump with said auxiliary motor to effect movement thereof and shifting of said main control valve.

8. A machine tool combining a carrier; hydraulic means for shifting said carrier; a main valve for determining the direction of said shift; and an auxiliary hydraulic system for automatically shifting said main valve in opposite directions, said system comprising a shifting piston, a reversing valve for determining the direction of movement of said shifting piston, and a pressure responsive valve for admitting fluid to said reversing piston.

9. A machine tool combining a carrier; hydraulic means for shifting said carrier; a main valve for determining the direction of said shift; and an auxiliary hydraulic system for automatically shifting said main valve in opposite directions, said system comprising a shifting piston, a reversing valve for determining the direction of movement of said shifting piston, and a pressure responsive valve for admitting fluid to said reversing piston.

10. A machine tool combining a translatable member; a hydraulic system including a hydraulic motor for propelling said member; a main valve for controlling the action of said hydraulic motor; means for arresting the movement of said member; and means operative after a predetermined delay for reversing the movement of said member, the last named means including a second hydraulic motor; a reversing valve, a mechanical connection between said second hydraulic motor and both of said valves, said mechanical connection including a lost motion device; a fluid pressure line connected to actuate said third motor and a second valve embodied in said pressure line and adapted to be shifted by variation in pressure in said hydraulic system to cause reversal of said second hydraulic motor.

11. A machine tool combining a hydraulic motor; a main valve for determining the action of said hydraulic motor; means to shift said main valve to vary the action of said motor, said means including a fluid pressure line, an auxiliary valve in said pressure line, said auxiliary valve being constantly urged in one direction and adapted to be hydraulically shifted against said urge; and hydraulically actuated mechanism controlled by said auxiliary valve and connected with said main valve for determining the position of said main valve thereby to determine the actuation of said motor.

12. A machine tool combining a reciprocable carrier; an hydraulic motor for propelling it, said motor including a pump for withdrawing fluid from the exhaust end thereof; a rigid stop for arresting the travel of said carrier at the end of one of its strokes whereby said pump acts to reduce the pressure in the exhaust end of said motor; a pressure controlled valve connected to the exhaust of said motor and adapted to be actuated upon said reduction in pressure; an auxiliary piston controlled by said valve; and means actuated by said auxiliary piston for varying the action of said hydraulic motor.

In witness whereof, we have hereunto subscribed our names.

HANS ERNST.
LESTER F. NENNINGER.

sure controlled valve connected to the exhaust of said motor and adapted to be actuated upon said reduction in pressure; an auxiliary piston controlled by said valve; and means actuated by said auxiliary piston for varying the action of said hydraulic motor.

In witness whereof, we have hereunto subscribed our names.

HANS ERNST.
LESTER F. NENNINGER.

CERTIFICATE OF CORRECTION.

Patent No. 1,838,028.   Granted December 22, 1931, to

HANS ERNST ET AL.

It is hereby certified that error appears in the printed specification of the above numbered patent requiring correction as follows: Page 5, line 104, claim 10, for "third motor and a second valve" read second motor and a third valve; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.

CERTIFICATE OF CORRECTION.

Patent No. 1,838,028.                            Granted December 22, 1931, to

HANS ERNST ET AL.

It is hereby certified that error appears in the printed specification of the above numbered patent requiring correction as follows: Page 5, line 104, claim 10, for "third motor and a second valve" read second motor and a third valve; and that the said Letters Patent should be read with this correction therein that the same may conform to the record of the case in the Patent Office.

Signed and sealed this 9th day of February, A. D. 1932.

(Seal)                                                          M. J. Moore,
                                                         Acting Commissioner of Patents.